Patented Nov. 30, 1937

2,100,914

UNITED STATES PATENT OFFICE 2,100,914

STORAGE BATTERY

Joseph A. Orsino, East Cleveland, Ohio, assignor to Willard Storage Battery Company, Cleveland, Ohio, a corporation of West Virginia No Drawing. Application November 25, 1935, Serial No. 51,477

7 Claims. (Cl. 136—26)

This invention relates to storage batteries of the lead-acid type and has especial reference to a novel expander which is incorporated in the paste used in forming the plates, particularly the negative plates, for the purpose of giving the plates increased capacity and greater life.

My improved expander which is incorporated with the oxide or oxides of lead used in making the paste, and particularly the paste for the negative plates, consists of ground or comminuted animal leather. In producing the expander, hides of various animals can be utilized, but I prefer to use cowhide and particularly oak-tanned cowhide.

The material may be pulverized or comminuted in various ways, as by grinding. No particular degree of fineness is required, but the material which I have used to advantage was passed through a 28-mesh screen. The ground leather thus passed through a 28-mesh screen has varying degrees of fineness, some of the particles being of a somewhat stringy nature and therefore relatively coarse and others being of considerably greater fineness, some doubtless fine enough to to pass through a 100-mesh screen. As stated above, no particular degree of fineness is essential, and it is immaterial whether the particles are of more or less uniform fineness although they may be so.

The amount of this expander which is used in the paste for the negative plates may be varied considerably, for example, from about 0.1% to about 1% by weight, the particular amount depending largely upon the conditions of temperature under which the battery is to be operated, a higher percentage being generally employed when the plates are used in batteries subject to low temperature service conditions. The expander can best be applied by thoroughly and uniformly mixing it (together with any other expander or expanders which may be used therewith) with the oxide or oxides of lead used in making the paste, after which dilute sulphuric acid, water, or other liquid used in forming the paste may be added.

Although the use of the present expander in the negative plates only is now believed to be important, and while I believe it has no particular advantage when used in the positive plates, its use in positive plates is not to be precluded.

This comminuted or pulverized leather may be used in the paste without any other expander or it may be used with one or more of the well known inert inorganic expanders, as, for example, barites, blanc fixe, silica, carbon black, lampblack, graphite, barium sulphate, or the sulphate of other alkaline earth metals, the use of barium sulphate being preferred.

By way of example, I have obtained excellent results by the use of 0.2% pulverized leather, such as oak-tanned cowhide or sole leather, 0.3% barium sulphate, and 0.15% lampblack, the percentages being by weight. Of course the percentages of pulverized leather and the inorganic expander or expanders can each be varied up or down as desired, depending upon the kind of battery which is being produced and the conditions under which it is designed to operate. When both the comminuted leather and an inorganic expander are employed, the beneficial results, particularly in the cyclic life of the battery, are not the sum of the benefits contributed by each. On the other hand, tests have shown that the inorganic expander increases the cyclic life of the battery over the cyclic life when no expander is employed; that the comminuted leather alone increases the cyclic life still more; but that the increase in the cyclic life of the battery having both an inorganic expander and comminuted leather incorporated in the paste is considerably more than the sum of the increases due to the inorganic expander alone and to the comminuted leather alone. Furthermore, with batteries having no expander, an inorganic expander alone, or comminuted leather alone as an expander, in each instance there is a gradual decrease in capacity during the life test of the battery, whereas with the conjoint use of an inorganic expander and comminuted leather there is an increase in the capacity of the battery for a large portion of the cyclic life thereof rather than a decrease as might be expected from the use of either an inorganic expander alone or comminuted leather alone.

It may be advantageous also to employ with the pulverized leather another organic expander, such, for example, as humic acid or humic substance, in addition to the inorganic expander or expanders.

It will be seen, therefore, that my invention is susceptible of considerable modification, and I aim in my claims to cover all changes or modifications which do not involve a departure from the spirit and scope of the invention in its broad aspects.

Having thus described my invention, I claim:

1. A plate for storage batteries of the lead-acid type having a minor proportion of pulverized leather incorporated in the lead compound of the plate.

2. A plate for storage batteries of the lead-acid type having incorporated in the lead compound comminuted leather and an inert inorganic expander, the leather and the inorganic expander being in minor proportion to the lead compound.

3. A plate for storage batteries of the lead-acid type having incorporated therein a plurality of expanders including comminuted leather and a sulphate of an alkaline earth metal, the expanders being in minor proportion to the lead compound of the plate.

4. A plate for storage batteries of the lead-acid type having incorporated in the lead compound of the plate a plurality of expanders including comminuted leather and barium sulphate, the expanders being in minor proportion to the lead compound.

5. A plate for storage batteries of the lead-acid type having comminuted leather incorporated therein to an amount varying from substantially 0.1% by weight to substantially 1% by weight.

6. A paste for storage batteries of the lead-acid type containing a major proportion of oxide or oxides of lead and a minor proportion of comminuted leather.

7. A plate for storage batteries of the lead-acid type having comminuted leather incorporated therein.

JOSEPH A. ORSINO.